US006958168B2

(12) United States Patent
Westfield

(10) Patent No.: US 6,958,168 B2
(45) Date of Patent: Oct. 25, 2005

(54) BAKING RACK ASSEMBLY AND METHOD FOR AUTOMATIC BREAD MAKING MACHINE

(75) Inventor: Barbara Westfield, Chicago, IL (US)

(73) Assignee: Salton, Inc., Lake Forest, IL (US)

( * ) Notice: Subject to any disclaimer, the term of this patent is extended or adjusted under 35 U.S.C. 154(b) by 0 days.

(21) Appl. No.: 09/551,973

(22) Filed: Apr. 14, 2000

(65) Prior Publication Data

US 2002/0104443 A1 Aug. 8, 2002

(51) Int. Cl.[7] .................................... F24C 15/16

(52) U.S. Cl. ....................... 426/503; 426/504; 426/505; 426/519; 426/523; 99/348; 99/448; 99/450; 211/85.4; 126/337 R

(58) Field of Search .......................... 99/348, 426, 448, 99/450, 467; 426/523, 503–505, 519; 211/83.4; 126/337 R

(56) References Cited

U.S. PATENT DOCUMENTS

| | | | | | |
|---|---|---|---|---|---|
| 519,580 | A | * | 5/1894 | Kelsey | |
| 1,583,295 | A | * | 5/1926 | Larsen | |
| 2,251,600 | A | * | 8/1941 | Pollock | 53/1 |
| 2,671,004 | A | * | 3/1954 | Chadwick et al. | 312/350 |
| 2,842,043 | A | * | 7/1958 | Reuland | 99/259 |
| 4,957,040 | A | | 9/1990 | Nakakura et al. | 99/348 |
| 5,228,385 | A | * | 7/1993 | Friedrich et al. | 99/352 |
| 5,435,235 | A | | 7/1995 | Yoshida | 99/327 |
| 5,445,061 | A | * | 8/1995 | Barradas | 99/340 |
| 5,588,352 | A | * | 12/1996 | Harrison | 99/339 |
| D378,484 | S | | 3/1997 | Harrison | D7/350 |
| 5,615,605 | A | | 4/1997 | Kakimoto et al. | 99/348 |
| 5,665,258 | A | * | 9/1997 | Hsu | 219/388 |
| 5,782,174 | A | * | 7/1998 | Cohn et al. | 99/476 |
| 5,890,421 | A | * | 4/1999 | Smith-Berry et al. | 99/441 |
| 5,901,637 | A | * | 5/1999 | Glucksman et al. | 99/326 |
| 5,937,740 | A | | 8/1999 | Kubota et al. | 99/327 |
| 5,967,020 | A | | 10/1999 | Soyama et al. | 99/327 |

* cited by examiner

*Primary Examiner*—Drew Becker
(74) *Attorney, Agent, or Firm*—Seed Intellectual Property Law Group PLLC

(57) ABSTRACT

An automatic bread making machine having a baking chamber and a container for receiving bread making ingredients is provided with a backing rack assembly that is selectively placed into and removed from the baking chamber. The baking rack assembly is provided with a frame and a plurality of trays coupled to the frame, in vertically spaced relation to each other. Each of the frames provides a substantially horizontal support surface for a quantity of dough that can be proofed or baked on the tray when the rack assembly is positioned within the baking chamber. A user may therefore bake a plurality of portions of dough within a unitary chamber of an automatic bread making machine.

19 Claims, 6 Drawing Sheets

BAKING RACK ASSEMBLY AND METHOD FOR AUTOMATIC BREAD MAKING MACHINE

TECHNICAL FIELD

This invention relates to automatic bread making machines, and more particularly, to a baking rack assembly and method for use thereof

BACKGROUND OF THE INVENTION

In recent years, automatic bread making machines have become increasingly popular. These machines make bread without requiring a user to expend the time and effort associated with mixing, repeated kneading, and baking. Typically, a user pours the bread making ingredients into the machine, and presses a few selected control buttons. The machine includes electronic control circuitry that controls the operation of a motor and heating element. By selecting a desired program, the user may leave the machine to mix the ingredients, knead the dough, allow the dough to rise, and bake the dough, resulting in a baked loaf of bread.

At times, however, the user may desire the end, baked product to be in a form other than a single loaf of bread. For example, the user may wish to make rolls, baguettes, bagels, etc. In this situation, a user may place the ingredients into the chamber of the automatic bread making machine, and select a program that simply mixes and kneads the dough, but does not bake it. The user then removes the dough from the machine, divides it and forms it into the desired shapes, and bakes the individual portions of dough in a conventional oven.

It would be advantageous to bake individually formed portions of dough in an automatic bread making machine. However, this is not possible with currently available machines, given that these machines provide only a single, unitary baking chamber. The present invention provides this and other advantages, as will be apparent from the following detailed description and accompanying figures.

SUMMARY OF THE INVENTION

Briefly, the present invention allows a user to bake multiple portions of dough, formed into any desired shape, within an automatic bread making machine. An automatic bread making machine, according to the present invention, includes a container having an opening for receiving a quantity of bread making ingredients. The automatic bread making machine is further provided with a motor coupled to a mixing blade for mixing the ingredients within the container to form a dough, and to further knead the dough. The container is positioned within a baking chamber, to which a heating element is coupled. The operation of the motor and heating element are controlled by electronic control circuitry provided in the bread making machine. The electronic control circuitry includes a microcomputer, which further includes software instruction processing means, for example a microprocessor, which executes a series of preprogrammed bread making instructions stored in a data/instruction storage means, such as a computer register or memory. The user selects a program through a keyboard of a control panel provided on the bread machine. The control panel also includes a visual display that provides bread making status information to the user. The functions of an automatic bread making machine described above are of a type known in the art, and will therefore not be described in greater detail.

In accordance with the present invention, a baking rack assembly having a frame, and a plurality of trays coupled to the frame in vertically spaced relation to each other, is selectively placed into and removed from the baking chamber of an automatic bread making machine. Each of the trays provides a substantially horizontal support surface for a quantity of dough that can be proofed or baked on the tray when the frame and trays are positioned within the baking chamber. To facilitate the insertion and removal of the baking rack assembly, a handle is coupled to an upper region of the frame. To facilitate the flow of air around and through the assembly, the frame is of an open-sided construction, and each of the trays is provided with one or more holes extending therethrough.

In operation, a dough may be formed using the automatic bread making machine by placing the ingredients within the machine and selecting an appropriate program to mix and knead the dough. In accordance with the present invention, the dough may then be removed from the bread making machine, and divided and formed into a plurality of portions. The individually formed portions of dough may be placed on the trays of the baking rack assembly, and the baking rack assembly positioned within the baking chamber of the bread making machine. A program may then be executed to bake the individual portions of dough.

The baking rack assembly of the present invention therefore allows a user to bake multiple portions of dough within the unitary chamber of a conventional bread making machine, by holding the individual portions of dough separate from each other in vertically and/or horizontally spaced relation to each other. A user may therefore form individual baked goods, for example rolls, baguettes, bagels, etc., entirely with the automatic bread making machine, without use of a conventional oven. Alternatively, a user may purchase premade dough, or make dough by conventional means, and bake individual portions of dough within the automatic bread making machine.

DETAILED DESCRIPTION OF THE INVENTION

Figure 1:
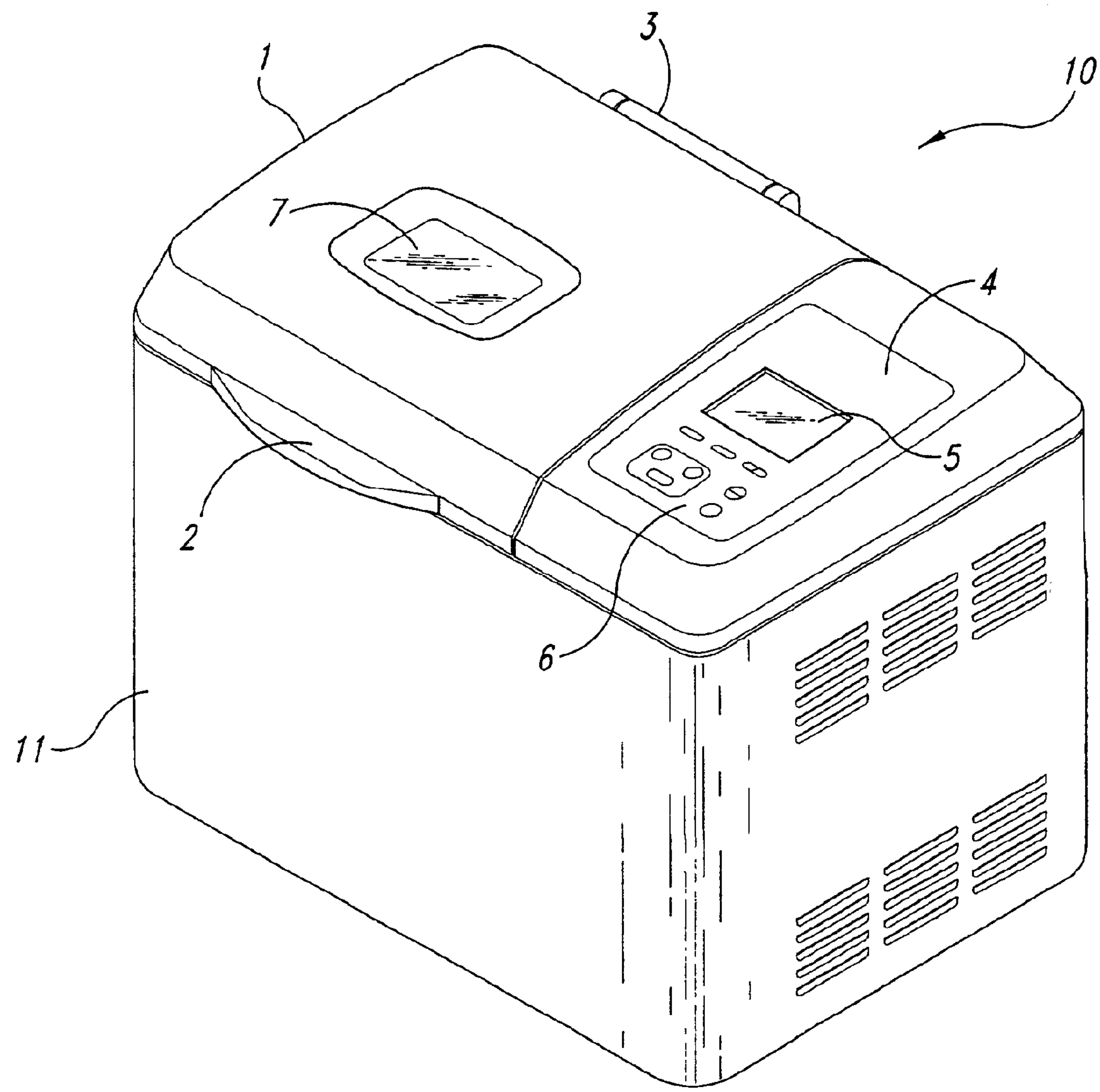
FIG. 1 is a front isometric view of an automatic bread making machine.

FIG. 1 illustrates an automatic bread making machine 10 provided in accordance with the present invention. The bread making machine 10 includes a housing 11 and a lid 1 that may be raised and lowered by grasping handle 2 and rotating the lid 1 about hinge 3. Lifting lid 1 allows a user to access an inner region of the bread making machine 10, as described in greater detail below. A control panel 4 provided in the bread making machine 10 has a display unit 5 and keyboard 6. As described previously, the bread making machine 10 includes electronic control circuitry that executes various bread making software instructions that are stored in the circuitry, and selected by a user via the keyboard 6. The visual display unit 5 provides bread making status information to the user, in accordance with conventional technology. If desired, the lid 1 is provided with a window 7 through which a user can observe the bread making process.

Figure 2:
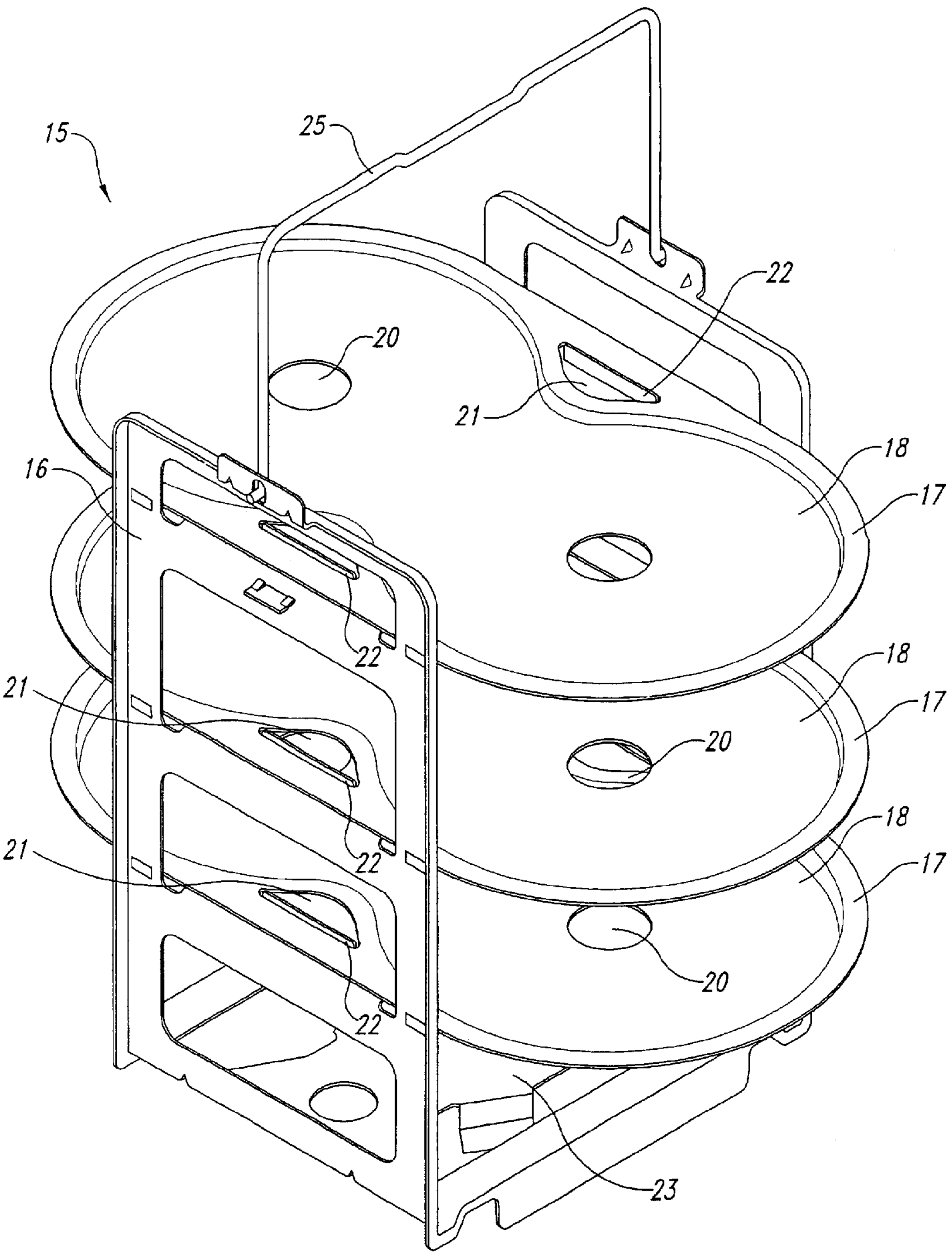
FIG. 2 is a front isometric view of a baking rack assembly provided in accordance with the present invention.
Figure 4:
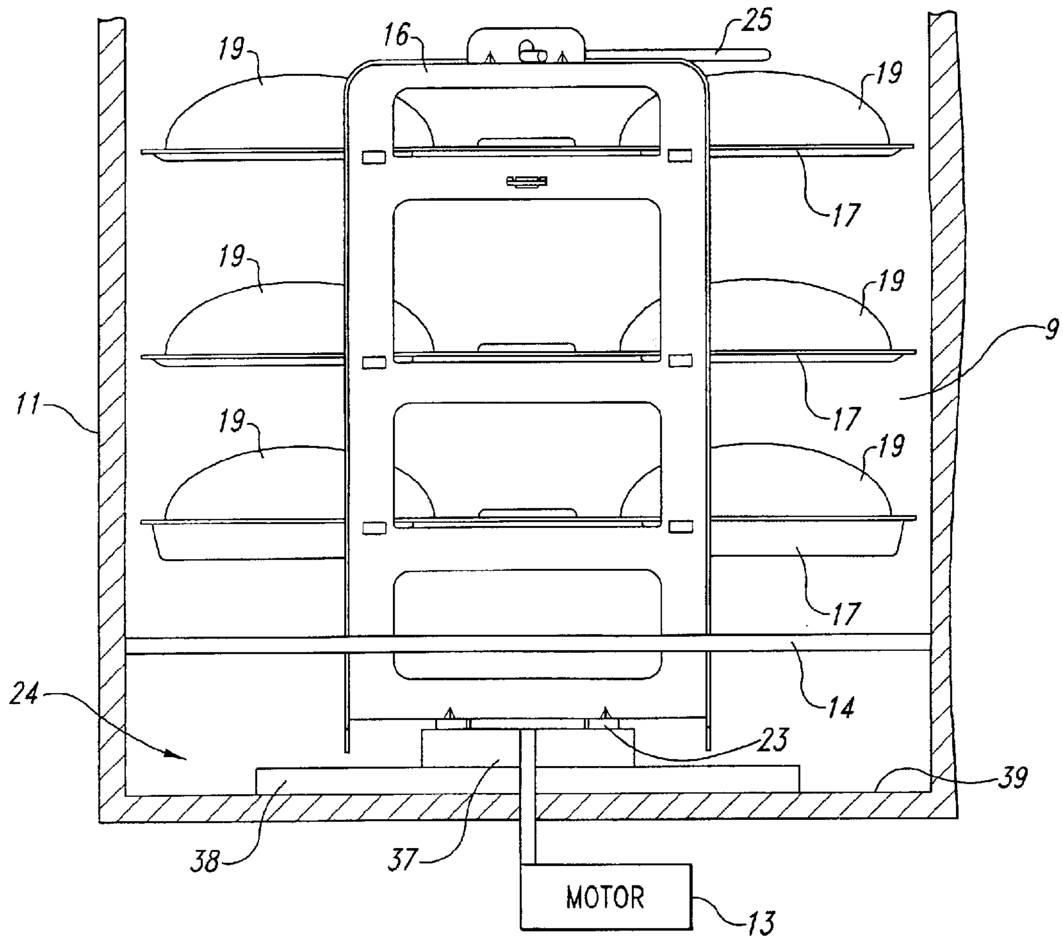
FIG. 4 is a partial cross-sectional, schematic illustration of a baking rack assembly provided in accordance with the present invention, shown positioned within a chamber of the bread making machine of FIG. 1.

As illustrated in FIGS. 2 and 4, a baking rack assembly 15 provided in accordance with the present invention includes a frame 16 and a plurality of trays 17 that are coupled to the frame 16 in vertically spaced relation to each other. The frame 16 and associated trays 17 are selectively placed into and removed from a baking chamber 9 of the automatic bread making machine 10. To facilitate the insertion and removal of the rack assembly 15, a handle 25 is coupled to the frame 16.

Each of the trays 17 provides a substantially horizontal support surface 18 for a quantity of dough 19 that can be proofed or baked on the tray 17 when the frame 16 and trays 17 are positioned within the baking chamber 9. To facilitate the flow of air around and through the assembly, the frame 16 has an open-walled construction, as best seen in FIGS. 2 and 4, and each of the trays 17 is provided with one or more holes 20 therethrough. The trays may be provided with a few discrete holes, as illustrated, or the trays may be perforated. Alternatively, the trays may be solid. The shape and size of the trays 17 and frame 16 may also be varied, to accommodate various internal configurations of automatic bread making machine baking chambers. The trays 17 may be fixed to the frame 16, or may be removably coupled thereto. Although this removable coupling may be accomplished in a variety of ways, in a preferred embodiment, as illustrated in FIG. 2, each of the trays 17 is provided with a plurality of openings 21 that matingly engage flanges 22 provided on the frame 16.

As illustrated in FIG. 4, the frame 16 is provided with a base member 23 that is coupled to a bottom region 24 of baking chamber 9. Although this coupling may be achieved in a variety of ways, in a preferred embodiment, the base member 23 forms an interference fit with a coupling device 37 positioned in the baking chamber 9. The coupling device 37 may be a conventional element of a bread making machine, provided to releasably couple container 12 in the baking chamber 9. Alternatively, the base member 23 may simply rest against a bottom surface 39 of the chamber 9.

Figure 3:
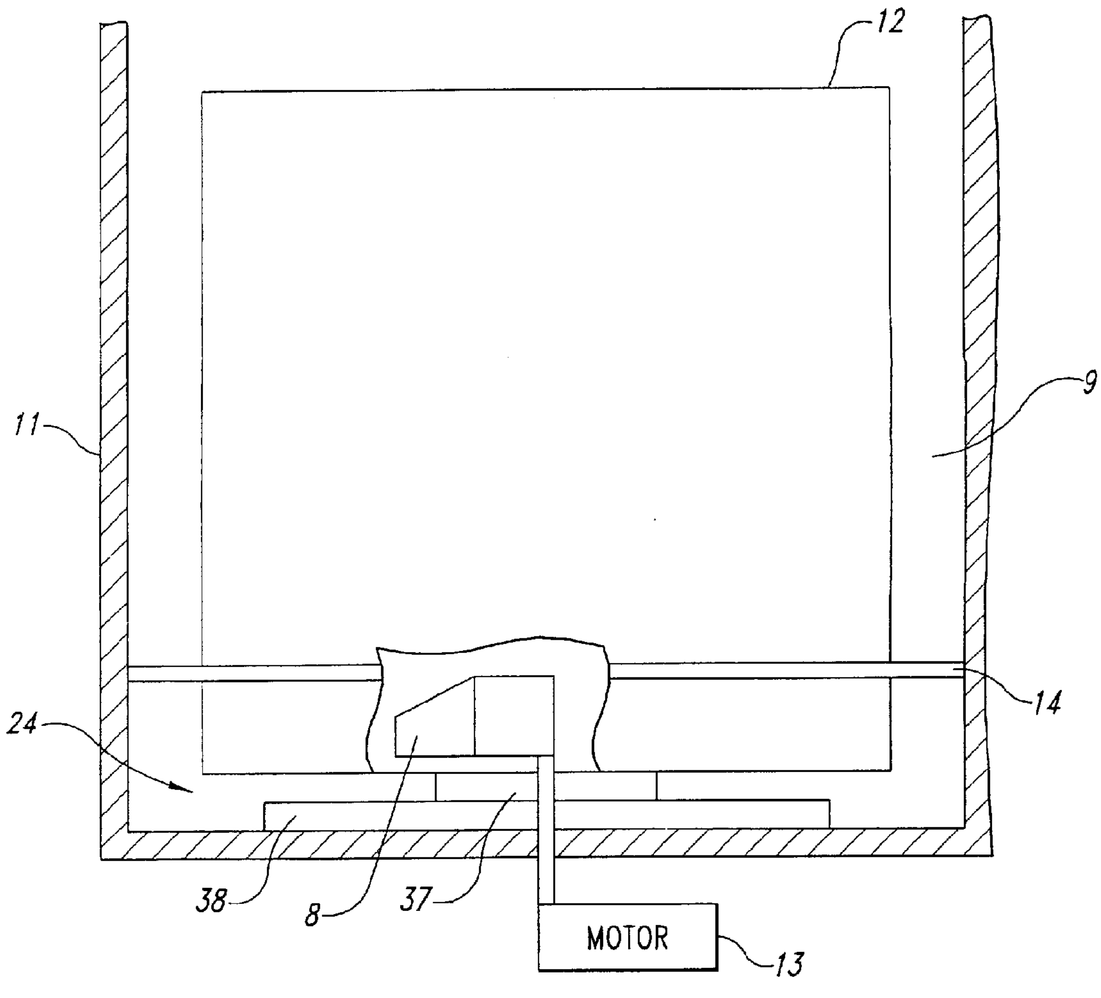
FIG. 3 is a partial cross-sectional, schematic illustration of a container and baking chamber forming a portion of the automatic bread making machine of FIG. 1.
Figure 5:
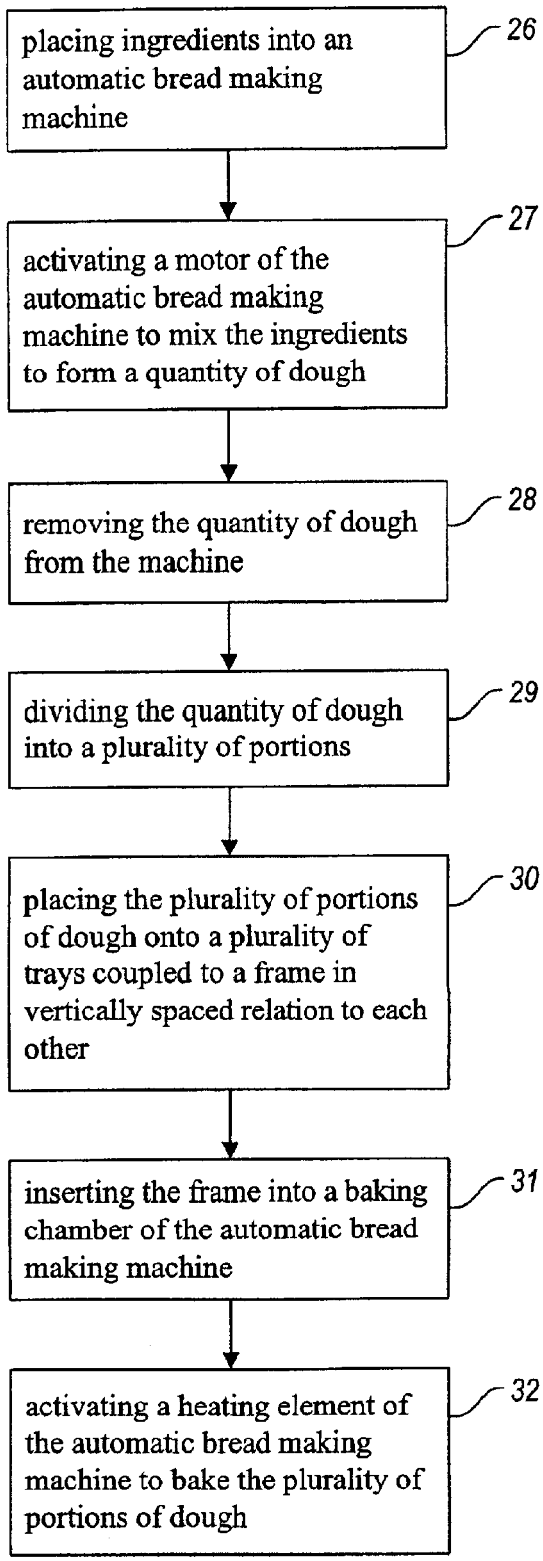
FIG. 5 is a diagram illustrating the steps of a method for baking a plurality of portions of dough, in accordance with the present invention.

In operation, therefore, as illustrated in FIGS. 3–5, a plurality of portions of dough may be made and baked by placing ingredients into a container 12 of an automatic bread making machine 10, step 26. A motor 13 coupled to a mixing blade 8 is activated by the user to mix the ingredients within the container 12 to form a quantity of dough, step 27. The container 12, which is releasably coupled to the baking chamber 9 via coupling device 37, and the dough contained therein, are removed from the machine. Once the quantity of dough 19 is removed from the machine, step 28, the user can divide the dough into a selected number of portions, step 29, and shape the dough as desired. The user may then place the plurality of portions of dough 19 onto the plurality of trays 17 coupled to frame 16, step 30, and insert the baking rack assembly 15 into the baking chamber 9, step 31. As described previously, this may be accomplished by pushing the base member 23 of frame 16 into coupling device 37. The heating element 14 of the automatic bread making machine may then be activated, step 32, to bake the plurality of portions of dough. If desired, water may be placed in rubberized steam well 38 prior to baking the dough. Doing so provides superior oven spring and a crisper crust.

Figure 6:
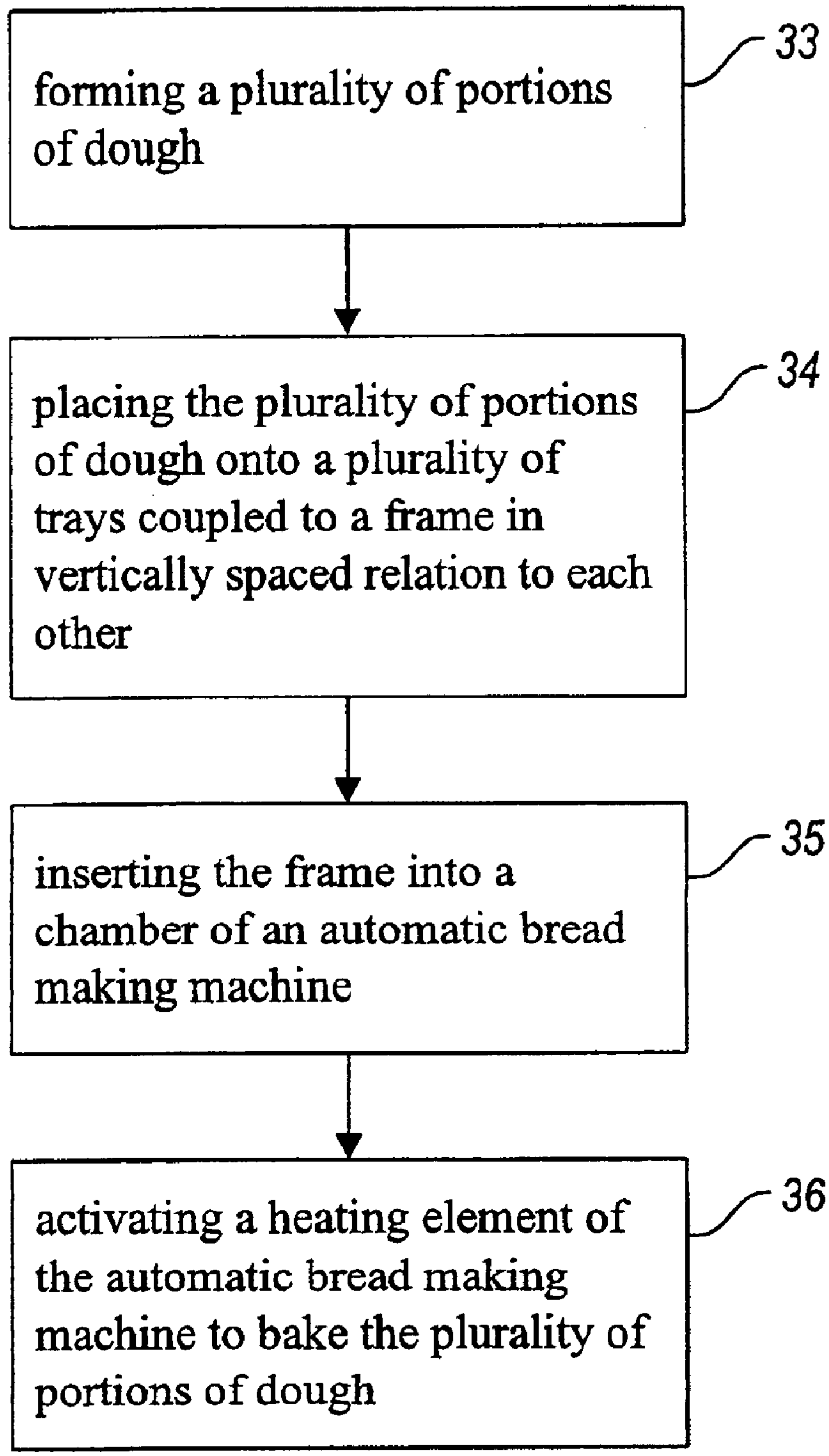
FIG. 6 is a diagram illustrating the steps of an alternative embodiment of a method for baking a plurality of portions of dough provided in accordance with the present invention.

Alternatively, as illustrated in FIG. 6, a user may use premade dough, and simply form a plurality of portions of dough, step 33. The formed portions of dough are then placed on the trays 17, step 34, and the baking rack assembly 15 is inserted into the chamber 9, step 35. An appropriate program is then selected by the user, thereby activating the heating element, step 36, to bake the individual portions of dough. Again, steam may be introduced immediately preceding the baking cycle by placing water in a steam well 38.

It will be understood by one of ordinary skill in the art that various programs may be provided with an automatic bread making machine appropriate for proofing and/or baking a variety of types of individual portions of dough, for example small rolls, baguettes, bagels, etc. It will also be understood that the baking rack assembly 15 of the present invention may be used in conjunction with other available features of conventional automatic bread making machines.

A baking rack assembly and method of use for an automatic bread making machine have been shown and described. From the foregoing, it will be appreciated that although embodiments of the invention have been described herein for purposes of illustration, various modifications may be made without deviating from the spirit of the invention. Thus, the present invention is not limited to the embodiments described herein, but rather is defined by the claims which follow.

What is claimed is:

1. A baking rack assembly for an automatic bread making machine comprising:

a frame having two opposing, laterally spaced sidewalls extending upward from and coupled to a base member, the base member configured to engage a coupling device provided in a baking chamber of the automatic bread making machine when the frame is positioned in the baking chamber; and a plurality of trays coupled to the frame in vertically spaced relation to each other, each tray providing a substantially horizontal support surface for a quantity of dough wherein the frame can be selectively placed into and removed from the baking chamber as a unit.

2. The baking rack assembly according to claim 1 wherein each of the trays is provided with one or more holes extending therethrough to facilitate the flow of air around and through the assembly.

3. The baking rack assembly according to claim 1 wherein the trays are removably coupled to the frame.

4. The baking rack assembly according to claim 1, further comprising a handle coupled to the frame.

5. An automatic bread making machine comprising:

a housing having a baking chamber coupled to a source of heat;

control circuitry configured to execute various bread making instructions;

a baking rack assembly comprising a frame that is selectively placed into and removed from the baking chamber as a unit, the frame having two opposing, laterally spaced sidewalls extending upward from and coupled to a base member a coupling member positioned in a bottom region of the baking chamber and configured to engage the base member; and a plurality of trays coupled to and supported by the two sidewalls of the frame in vertically spaced relation to each other, each tray providing a substantially horizontal support surface for a quantity of dough that can be proofed or baked on the tray when the frame and trays are positioned within the baking chamber.

6. An automatic bread making machine according to claim 5 wherein each of the trays is provided with one or more holes extending therethrough to facilitate the flow of air around and through the assembly.

7. An automatic bread making machine according to claim 5 wherein the trays are removably coupled to the frame.

8. An automatic bread making machine according to claim 5, further comprising a handle coupled to the frame.

9. An automatic bread making machine comprising:

a housing having a baking chamber and a container for receiving bread making ingredients, the container being releasably coupled to the baking chamber via a coupling device provided in the baking chamber;

a motor for mixing the ingredients within the container to form a dough;

a frame that is selectively placed into and removed from the baking chamber, the frame having two opposing, laterally spaced sidewalls extending upward from and coupled to a base member with a plurality of trays coupled to and supported by the two sidewalls of the frame in vertically spaced relation to each other, each tray providing a substantially horizontal support surface for a quantity of the dough, the base member engaging the coupling device when the frame is positioned in the baking chamber, the frame also having a permanent opening between the two sidewalls with dimensions sufficient to permit one of the trays to be passed through the opening while oriented in a substantially horizontal position; and a heating element coupled to the baking chamber to bake the dough positioned on the trays when the frame and trays are positioned within the baking chamber.

10. An automatic bread making machine according to claim 9 wherein each of the trays is provided with one or more holes extending therethrough to facilitate the flow of air around and through the assembly.

11. An automatic bread making machine according to claim 9 wherein the trays are removably coupled to the frame.

12. An automatic bread making machine according to claim 9 wherein the base member is coupled to a bottom region of the baking chamber.

13. An automatic bread making machine according to claim 9 further comprising a handle coupled to the frame.

14. A method of baking a plurality of portions of dough comprising:

placing ingredients into an automatic bread making machine;

activating a motor of the automatic bread making machine to mix the ingredients to form a quantity of dough;

removing the quantity of dough from the machine;

dividing the quantity of dough into a plurality of portions;

placing the plurality of portions of dough onto a plurality of trays coupled to and supported by opposing sidewalls of a frame in vertically spaced relation to each other;

inserting the frame and trays coupled thereto into a baking chamber of the automatic bread making machine until a base member of the frame engages a coupling device in the baking chamber;

activating a heating element of the automatic bread making machine to bake the plurality of portions of dough; and removing the baked dough away from the frame through a permanent opening of the frame, the opening having dimensions sufficient to permit at least one of the trays to be passed through the opening while oriented in a substantially horizontal position.

15. The method of claim 14 wherein the base member comprises a coupling member extending downward from a bottom surface thereof, and wherein the inserting step includes inserting the frame and trays coupled thereto into the baking chamber until the coupling member engages the coupling device in the baking chamber to form an interference fit therewith.

16. A baking rack assembly for an automatic bread making machine comprising:

a frame having two opposing, laterally spaced sidewalls extending upward from and coupled to a base member, the frame configured to be positioned within a baking chamber of the automatic bread making machine;

a coupling member extending downward from a bottom surface of the base member and configured to form an interference fit with a coupling member within the baking chamber; and the frame configured to receive a plurality of trays coupled thereto in vertically spaced relation to each other, such that the frame and trays can be selectively placed into and removed from the baking chamber as a unit.

17. The baking rack assembly of claim 16, further comprising a plurality of trays configured to be received into the frame, each tray configured to prove a substantially horizontal support surface for a quantity of dough.

18. The baking rack assembly according to claim 17 wherein the trays are removably coupled to the frame.

19. The baking rack assembly according to claim 17 wherein each of the trays is provided with one or more holes extending therethrough to facilitate the flow of air around and through the assembly.

* * * * *